Dec. 14, 1948.  G. GULDBRANDSEN  2,456,186
DIAL SCALE MECHANISM
Filed Jan. 11, 1947
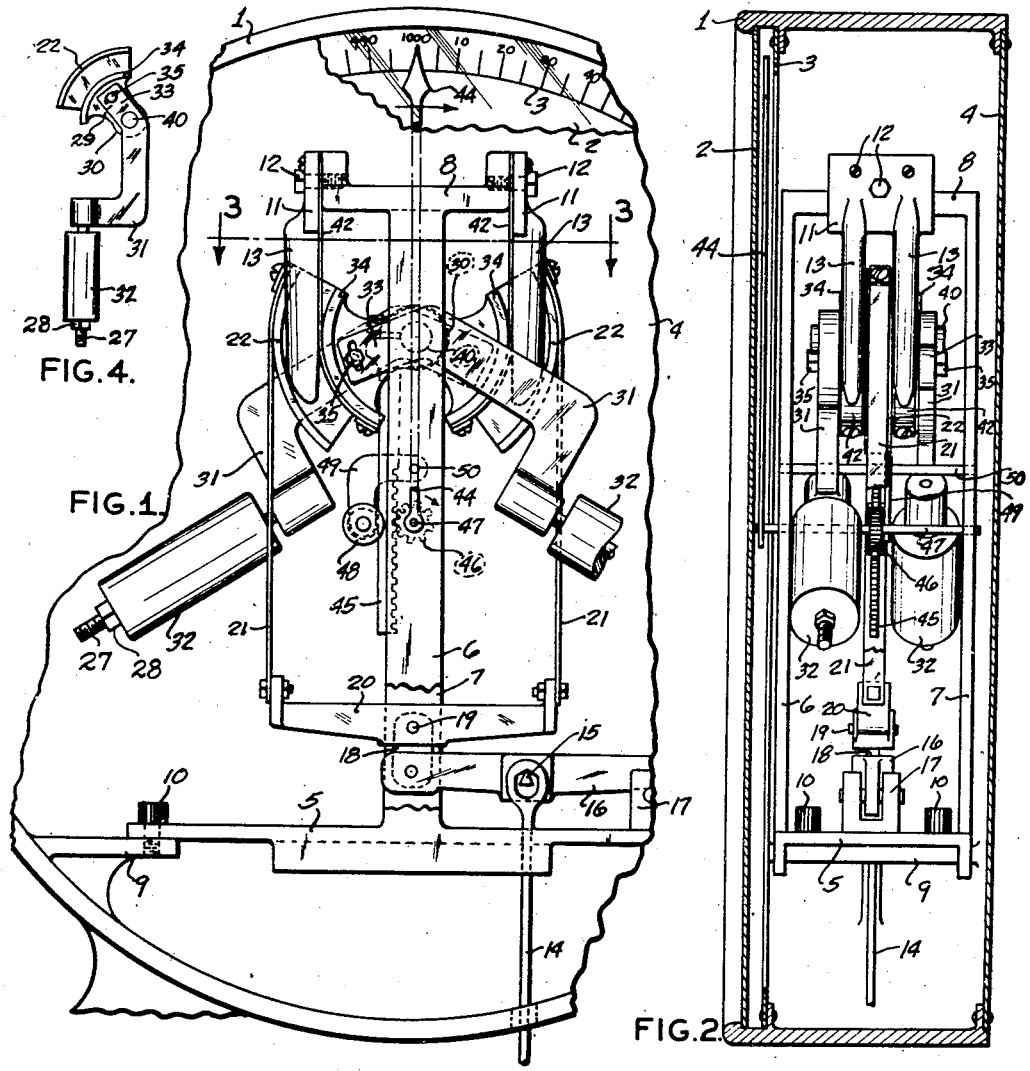
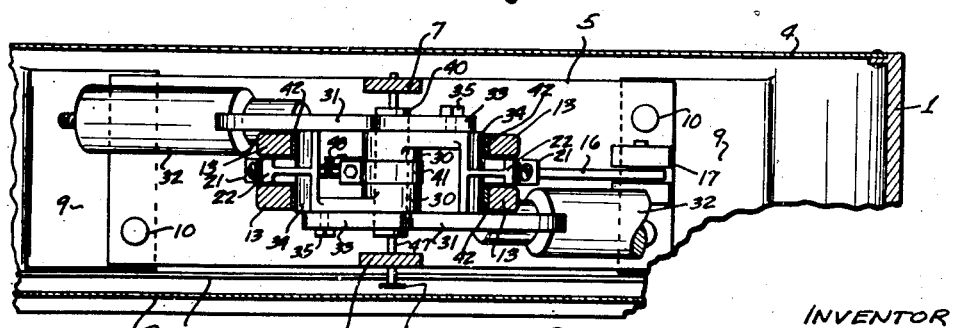
INVENTOR
GULDBRAND GULDBRANDSEN
BY Paul L. Keeler
ATTORNEY Patented Dec. 14, 1948

2,456,186

UNITED STATES PATENT OFFICE 2,456,186

DIAL SCALE MECHANISM

Guldbrand Guldbrandsen, St. Johnsbury, Vt., assignor to Fairbanks, Morse & Co., Chicago, Ill., a corporation of Illinois Application January 11, 1947, Serial No. 721,510

5 Claims. (Cl. 265—61)

This invention relates to dial weighing scales and has particular reference to improvements in weighing and indicating mechanisms of double pendulum type.

The principal object of my invention is to provide an improved construction for dial scale weighing mechanisms which will afford important advantages over existing constructions from the standpoints of simplicity, compactness, reliability and accuracy.

These and other objects and advantages will appear from the following description and from the accompanying drawings, wherein:

Fig. 1 is a front elevational view of the assembled scale mechanism as installed in a dial head housing, portions of which are shown broken away;

Fig. 2 is a side elevational view of the mechanism illustrated in Fig. 1, the dial housing structure being shown in section;

Fig. 3 is a transverse sectional view of the mechanism illustrated in Fig. 1, the section being taken at line 3—3 of that figure, and Fig. 4 is a plan view of one of the pendulum members.

Referring now by characters of reference to the drawings, the dial head includes an annular frame 1, glass front plate 2 disposed forwardly of the dial proper 3, and removable back plate 4. The dial head is customarily mounted on a hollow column, or sometimes upon a cabinet structure containing linkage by which load forces acting upon a weighing platform are transmitted to the weighing and indicating mechanism housed in the dial head. The platform lever system, specifically, is not directly involved in the present invention and hence is not illustrated herein.

The dial head mechanism is, in itself, a complete unitary assembly which may be installed in and removed from the dial housing as a unit. This assembly includes a frame structure having a horizontal base plate 5, vertical members 6 and 7 and a rectangular cap plate 8 joining the members 6 and 7 at their upper ends. In the present example the members 5, 6, 7 and 8 are formed integrally. Shelves 9 project inwardly from opposite inner sides of the annular dial frame and provide supports for the ends of the base plate 5, said plate being detachably secured to the shelves 9 by screws 10. Bifurcate members 11 are rigidly secured by screws 12 to the end faces of cap plate 8, these members providing depending vertical guides or tracks 13 along which roll the sector parts of the pendulum members, hereinafter described.

Describing now the operating members of the assembly, load forces applied to the platform levers (not shown) are transmitted from them, and through a vertical link 14, to the load pivot bearing 15 of a lever 16. Lever 16 has a fulcrum bearing 17 at one end, mounted on the base plate 5, the other end of the lever extending centrally between the vertical members 6 and 7 of the frame structure. The free end of the lever 16 is connected by a short link 18 to a centrally located pivot 19 of a horizontal equalizer bar 20. The ends of the equalizer bar are connected to flexible steel tapes 21 which extend vertically and have their upper extremities secured respectively to the load counterbalancing pendulum members, and specifically to the arcuate end faces of what are herein referred to the load sectors 22 of said pendulum members.

The pendulums are identical to each other and each includes an integral sector group having a hub 30 containing an anti-friction bearing assembly, an arcuate plate 34 joined at one end to the hub by a spoke portion 29, and the previously mentioned load sector 22 which projects from the outer arcuate face of the plate 34 between the ends thereof. The outer surface of plate 34 is circularly curved concentric with the hub and the pendulum is adapted to roll or "fulcrum" on the curved surface of this plate which is referred to herein as a fulcrum sector. To one side surface of the sector member above described is secured an angulate pendulum arm 31 which has an opening that registers with the opening in the hub part 30. A bolt 35 passes through an arcuate slot in an extension 33 of the pendulum arm 31, and threadedly engages the side of the sector group, this arrangement enabling the pendulum arm to be adjusted angularly with respect to the sector group. A cylindrical pendulum weight 32 is adjustable longitudinally on a threaded rod 27, constituting a part of the pendulum arm, and is adapted to be secured in adjusted position by a lock nut 28.

The pendulums are arranged in reversed relation with their bearing hubs 30 coaxial, and are mounted on and pivotally connected together by a shaft 40 that extends through and is journalled in the said bearing hubs. Mounted on anti-friction bearings on the shaft 40 between the pendulum bearing hubs 30 is a collar 41. The pendulums are supported on the frame structure by two pairs of flexible metal tapes 42, which are connected at their upper ends to the guide tracks 13, and at their lower ends to the fulcrum sectors 34. The cylindrical bearing faces of the fulcrum sectors lie in a circular arc of diameter closely approximating the distance between the inner confronting surfaces of the guide members 13. As appears, the load sectors 22 project outwardly through the space between pairs of the adjacent guide members 13.

It will be understood that load forces acting downwardly on the tapes 21 turn the pendulums in relatively opposite directions and cause their fulcrum sectors to roll upwardly along the guide members. Vertical movement of the pendulum bodies communicated to their common shaft 40 is utilized to operate the weight indicator hand 44. Thus, the collar 41 on the shaft 40 has dependingly secured thereto a rack bar 45 which meshes with a pinion gear 46 fixed on the indicator shaft 47, the latter being journalled in the upright members 6 and 7, as best appears in Fig. 3. A roller 48 carried by an arm 49 pivotally mounted by a pin 50 to the frame uprights 6 and 7 engages the back of the rack bar and maintains the same in meshed relation with the indicator pinion 46.

The weighing mechanism of my invention is chiefly distinguished by the relative arrangement of the opposed pendulum bodies, their disposition on the frame structure, their coaxial relationship and connection by a common shaft, all of which make for compactness, accuracy and reliability.

The embodiment of my invention herein shown and described is to be regarded as illustrative only, and it is to be understood that the invention is susceptible of variation and modification within the spirit and scope of the following claims.

I claim as my invention:

1. In a weighing scale, mechanism including a pair of pendulums each having a fulcrum sector and a load sector, said pendulums being arranged with the sectors thereof in coaxial relation, a member extending axially of said sectors, pivotally connecting the pendulums together, pendulum supporting tapes engaging said fulcrum sectors, tapes engaging said load sectors for transmitting load forces thereto, and weight indicating means operatively connected to said member.

2. In a weighing scale, mechanism including a shaft, a pair of pendulums each having a fulcrum sector and a load sector, said pendulums being mounted to pivot about said shaft, a frame structure having parallel vertical guides along which said fulcrum sectors are adapted to roll, pendulum supporting tapes engaging said fulcrum sectors and load tapes engaging said load sectors, and indicating means connected for operation responsive to translatory movement of said shaft.

3. In a weighing scale, mechanism including a frame having parallel vertical guides, a pair of pendulums each having a fulcrum sector and a load sector, said fulcrum sectors being disposed between said guides and adapted to roll along the inner opposed surfaces thereof, tapes supportingly engaging said fulcrum sectors for rolling movement as aforesaid, tapes engaging said load sectors for transmitting load forces thereto, a member pivotally connecting said pendulums together and adapted for translational movement therewith, an indicator, and means connecting said indicator for movement responsive to translational movement of said member.

4. In a weighing scale, mechanism comprising a frame having parallel vertical guides, a pair of pendulums having coaxial fulcrum sectors disposed between said guides and adapted to roll along opposed inner faces thereof, a shaft common to said fulcrum sectors and journalled therein, pendulum supporting tapes engaging the fulcrum sectors, load sectors on said pendulums projecting radially outwardly beyond said fulcrum sectors, load tapes engaging said load sectors, a weight indicator, and means connecting said indicator for movement responsive to translatory displacement of said shaft.

5. In a weighing scale, a frame structure having parallel vertical guides, a pair of pendulums, each having a fulcrum sector and a load sector, said fulcrum sectors being arranged in coaxial relation between said guides, pendulum supporting tapes engaging said fulcrum sectors and adapting them to roll along the inner confronting surfaces of said guides, load tapes connected to said load pendulums, an equalizer bar interconnecting said load tapes, means for transmitting load forces to said equalizer bar, a shaft journalled in said sectors connecting the pendulums together for conjoint translatory movement, and indicator means operatively connected to said shaft and movable responsively to translatory displacement thereof.

GULDBRAND GULDBRANDSEN.

REFERENCES CITED

The following references are of record in the file of this patent:

UNITED STATES PATENTS

| Number | Name | Date |
| --- | --- | --- |
| 1,458,480 | Gilbert | June 12, 1923 |

FOREIGN PATENTS

| Number | Country | Date |
| --- | --- | --- |
| 479,830 | Great Britain | Feb. 11, 1938 |